United States Patent [19]

Faulstich et al.

[11] 4,213,786

[45] Jul. 22, 1980

[54] LIGHTWEIGHT, HIGH REFRACTIVE INDEX GLASSES FOR SPECTACLE LENSES

[75] Inventors: Marga Faulstich, Mainz; Volkmar Geiler, Mainz-Mombach; Georg Gliemeroth, Mainz-Finthen, all of Fed. Rep. of Germany

[73] Assignee: JENAer Glaswerk Schott & Gen., Mainz, Fed. Rep. of Germany

[21] Appl. No.: 45,612

[22] Filed: Jun. 5, 1979

[30] Foreign Application Priority Data

Jun. 7, 1978 [DE] Fed. Rep. of Germany ....... 2824891

[51] Int. Cl.$^2$ .......................... C03C 3/08; C03C 3/10
[52] U.S. Cl. .................................. 106/47 Q; 106/53; 106/54
[58] Field of Search .................. 106/47 Q, 54, 53, 52

[56] References Cited

U.S. PATENT DOCUMENTS

| 3,898,093 | 8/1975 | Faulstich et al. | 106/54 |
| 4,055,435 | 10/1977 | Sagara | 106/47 Q |
| 4,084,978 | 4/1978 | Sagara | 106/47 Q |
| 4,128,432 | 12/1978 | Komorita et al. | 106/53 |

FOREIGN PATENT DOCUMENTS 1260712  2/1968  Fed. Rep. of Germany.

*Primary Examiner*—Helen M. McCarthy
*Attorney, Agent, or Firm*—Haight & Huard

[57] ABSTRACT

A glass having a high refractive index, preferably >1.77, and a low specific gravity, preferable ≦3.8, is provided for utilization as spectacle lenses. The glass consists essentially of 80 mol percent or more of light cationic oxides with the remainder being cationic oxides having a greater molecular weight. It has a high crystallization stability in a viscosity range >200 poises and an expansion coefficient $\alpha \times 10^7$ between 20°–300° C. of ≦100. Sufficiently light in weight to be well-suited for use as spectacle lenses, the glass can be continuously produced, as it has no pronounced tendency toward crystallization. The resulting corrective optical lenses have relatively high dioptric values, even with small center and edge thicknesses.

4 Claims, No Drawings

LIGHTWEIGHT, HIGH REFRACTIVE INDEX GLASSES FOR SPECTACLE LENSES

BACKGROUND OF THE INVENTION

This invention relates to glasses having a high refractive index and a low specific gravity for use as spectacle lenses.

In order to replace the hitherto lightest-weight and highest refractive index glasses (nd=1.70, s=3.0) used as spectacle lenses by an even higher refractive index glass (e.g., nd>1.79), so as to produce spectacle lenses having higher dioptric values with even smaller edge thicknesses (for negative lenses) and/or even smaller center thicknesses (for positive lenses) than previously done, thereby enabling further enlargement of the optically effective field of vision while also improving cosmetic appearances, the specific gravity must be approximately 3.3 if the weight of the glass lens is to remain approximately the same. In a glass with a refractive index of nd=1.79 and a specific gravity of approximately 3.7, the eventual glass weight increase is approximately 12 percent for negative and positive lenses as compared to a glass having a refractive index of nd=1.70 and a specific gravity of 3.0.

Optical glasses with refractive indexes nd of 1.76–1.80 and specific gravities s of ≦4.5 are known, but as a result of their weight are not suited for use as glasses for spectacle lenses, even though such glasses can be produced by continuous mass-production means. Examples of these unsuitable glasses are heavy flint glasses as follows:

| SF 6  | nd = 1.8051 | vd = 25.43 | s = 5.18 |
| SF 11 | nd = 1.7847 | vd = 25.76 | s = 4.74 |
| SF 14 | nd = 1.7612 | vd = 26.53 | s = 4.54 |

The known LaF glasses with a refractive index nd of >1.77 but a lower dispersion than heavy flint glasses have specific gravities of >4.0. Examples of the known LaF and LaSF glasses are as follows:

| LaF 25  | nd = 1.7843  | vd = 41.30 | s = 4.45 |
| LaF 22  | nd = 1.7818  | vd = 37.1  | s = 4.21 |
| Laf 9   | nd = 1.7950  | vd = 28.39 | s = 4.96 |
| LaSF N 3| nd = 1.8080  | vd = 40.75 | s = 4.68 |
| LaSF 8  | nd = 1.80741 | vd = 31.61 | s = 4.87 |

Further high refractive index optical glasses, e.g., as disclosed by German Patent Specification No. 12 60 712, having refractive indexes nd of 1.75–1.80 and specific gravities ≦4.0 are known, but they are not suitable for continuous production of solid glasses (e.g., glasses for spectacle lenses) and crucible melting due to their pronounced tendency towards crystallization. This crystallization tendency is determined by the magnitude of the crystal growth speed and the crystallization temperature range in relation to viscosity.

Glasses having a refractive index >1.75 consist of 14–46 percent by weight of alkaline earth metal oxides, including a heavy BaO content ≦10 percent by weight. The ZnO content is 10–20 percent by weight and the $TiO_2$-content is 10–25 percent by weight. Such glasses contain 12–20 percent by weight of $SiO_2$ and 8–20 percent by weight of $B_2O_3$ as glass components, the sum of glass forming components being <31 percent by weight. The color of such high titanium-bearing glasses must be influenced by rapid cooling in such a manner that the glass has a strongly marked titanium color (yellow-brown). The glasses must be cast at a viscosity <100 poises because their strong tendency towards crystallization precludes tank production and automatic processing at higher viscosities, e.g. between 200 to 600 poises. The ZnO content of 10–20 percent by weight in conjunction with the high $TiO_2$-content of 10–25 percent by weight is unfavorable for these glasses.

OBJECTS OF THE INVENTION

Accordingly, it is a general object of the present invention to provide a glass having a high refractive index and a low specific gravity which can be utilized in spectacle lenses.

Another object of the present invention is to provide a glass which has high crystallization stability within a given viscosity range in order that it may be continuously produced, good chemical resistance and a thermal expansion coefficient $\alpha \times 10^7$ between 20°–300° C. ≦100.

An additional object of the present invention is to provide a glass which can be used to produce spectacle lenses having high dioptric values with smaller edge or center thicknesses than lenses which are currently known.

A more particular object of the present invention is to form a series of new glasses to be used in spectacle manufacture which have refractive indexes nd of 1.77–1.81 and specific gravities s of ≦3.8 (particularly those within the 3.4–3.8 range), additionally having the following characteristics in order to be technically viable from a manufacturing and practical viewpoint:

(a) high crystallization stability in a viscosity range of >200 poises to allow continuous production;

(b) a thermal expansion coefficient $\alpha \times 10^7$ between 20°–300° C. of ≦100; and (c) good chemical resistance.

Upon study of the specification and appended claims, further objects, features and advantages of the present invention will become more fully apparent to those skilled in the art to which this invention pertains.

SUMMARY OF THE INVENTION

Briefly, the above and other objects, features and advantages of the present invention are attained in one aspect thereof by providing a glass for spectacle lenses having a refractive index nd of 1.77–1.81 and a specific gravity s of 3.4–3.8 which consists essentially of:

(a) more than 80 mol percent of mono and polyvalent cationic oxides having a molecular weight ≦100, namely

| $SiO_2$ | 22–30 mol percent |
| $B_2O_3$ | 17–23 mol percent |
| $SiO_2 + B_2O_3$ | 40–49 mol percent |
| Alkali metal oxides | 0–8 mol percent |
| CaO | 12–20 mol percent |
| MgO + CaO | 12–22 mol percent |
| $TiO_2$ | 17–24 mol percent; and correspondingly |

(b) less than 20 mol percent of cationic oxides having a molecular weight >100, namely

| $La_2O_3$ | 4–8 mol percent |
| $P_2O_5$ | 0–1 mol percent |
| BaO | 0–5 mol percent |

-continued

| | |
|---|---|
| SrO | 3–10 mol percent |
| BaO + SrO | 5–10 mol percent |
| PbO | 0–2 mol percent |
| $Al_2O_3$ | 0–1 mol percent |
| $ZrO_2$ | 0–2 mol percent |
| $Nb_2O_5$ | 0–1.5 mol percent ⎫ |
| $Ta_2O_5$ | 0–1.5 mol percent ⎬ 0–2 |
| $WO_3$ | 0–0.5 mol percent ⎭ | the glass having no pronounced tendency towards crystallization as determined by the magnitude of the crystal growth speed and the crystallization temperature range in relation to viscosity.

DETAILED DESCRIPTION

The new glasses according to the invention consist mainly (>80 mol percent) of light cationic oxides (having molecular weights of <100), whereby polyvalent components such as $La_2O_3$ (<8 mol percent) and eventually $Y_2O_3$ cannot be excluded. $Y_2O_3$ reduces the specific gravity in relation to $La_2O_3$. $La_2O_3$ may be replaced extensively by $Y_2O_3$, but only in small proportions of $Y_2O_3$ where this is combined with a reduction in crystallization tendencies as defined hereinabove.

The porportion of glass-forming components $SiO_2+B_2O_3$ $(+P_2O_5+GeO_2)$ is 30–40 percent by weight, the $SiO_2$ content being greater than the $B_2O_3$ content.

The alkali metal content of such glasses is restricted within the following limits:

| | | |
|---|---|---|
| $Li_2O$ | 0–5 ⎫ | |
| $Na_2O$ | 0–5 ⎬ | 0–5 percent by weight |
| $K_2O$ | 0–5 ⎭ | | so that the required expansion coefficient $\alpha \times 10^7$ can be adjusted between 20°–300° C. to $\leq 100$.

The sum of alkaline earth metal components should be 19–25 percent by weight, the BaO content being no higher than 8 percent by weight, the BaO+SrO content being <15 percent by weight, and the MgO+CaO content being 7–15 percent by weight.

The glasses formed in accordance with the present invention consequently consist essentially of:

(a) more than 80 mol percent of mono to polyvalent cationic oxides with molecular weights $\leq 100$, namely

| | |
|---|---|
| $SiO_2$ | 22–30 mol percent |
| $B_2O_3$ | 17–23 mol percent |
| $SiO_2 + B_2O_3$ | 40–49 mol percent |
| Alkali metal oxides | 0–8 mol percent |
| CaO | 12–20 mol percent |
| MgO + CaO | 12–22 mol percent |
| $TiO_2$ | 17–24 mol percent; and correspondingly |

(b) less than 20 mol percent of cationic oxides having a molecular weight of >100, namely

| | |
|---|---|
| $La_2O_3$ | 4–8 mol percent |
| $P_2O_5$ | 0–1 mol percent |
| BaO | 0–5 mol percent |
| SrO | 3–10 mol percent |
| BaO + SrO | 5–10 mol percent |
| PbO | 0–2 mol percent |
| $Al_2O_3$ | 0–1 mol percent |
| $ZrO_2$ | 0–2 mol percent |
| $Nb_2O_5$ | 0–1.5 mol percent ⎫ |
| $Ta_2O_5$ | 0–1.5 mol percent ⎬ 0–2 |
| $WO_3$ | 0–0.5 mol percent ⎭ |

The glasses made in accordance with the present invention consist (in percent by weight) essentially of:

| | |
|---|---|
| $SiO_2$ | 15–20 weight percent |
| $B_2O_3$ | 10–20 weight percent |
| CaO | 8–15 weight percent |
| $SiO_2 + B_2O_3$ | 30–40 weight percent |
| $La_2O_3$ | 16–26 weight percent |
| $TiO_2$ | 15–25 weight percent |
| MgO | 0–3 weight percent ⎫ |
| SrO | 1.0–10 weight percent ⎬ 8–15 |
| BaO | 0–8 weight percent ⎭ |
| ZnO | 0–4 weight percent |
| PbO | 0–2 weight percent |
| Alkaline earth metal oxides | 20–25 weight percent |
| $Al_2O_3$ | 0–2 weight percent |
| $ZrO_2$ | 0–3 weight percent |
| $Nb_2O_5$ | 0–5 weight percent |
| $Ta_2O_5$ | 0–2 weight percent |
| Alkali metal oxides | 0–5 weight percent |
| $P_2O_5$ | 0–3 weight percent |
| $GeO_2$ | 0–3 weight percent |

The sum of divalent components should be 20–29 percent by weight, the CaO+MgO content not being more than 15 percent by weight, since the crystallization tendency will otherwise increase considerably.

ZnO may be added to adjust the expansion coefficient up to 4 percent by weight; it is only with higher ZnO contents that the crystallization and segregation tendency increases.

$P_2O_5$ or $GeO_2$ can be used in smaller proportions, providing that a maximum crystallization stabilization is achieved.

Without further elaboration, it is believed that one skilled in the art can, using the preceding description, utilize the present invention to its fullest extent. The following examples, therefore, are to be construed as merely illustrative and not limitative of the remainder of the disclosure in any way whatsoever. Unless otherwise indicated, all pressures and temperatures are ambient and all parts and percentages are by weight.

The tables give specific examples of glasses formed according to the composition range suggested by the invention. Table 1 shows the compositions of 12 typical glasses as a percentage by weight and Table 2 shows the same glasses listed in molar percentages.

TABLE 1

| Oxide | Composition in percent by weight | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| $SiO_2$ | 15.0 | 17.4 | 16.3 | 17.0 | 18.6 | 18.8 | 19.4 | 18.6 | 18.0 | 19.7 | 19.5 | 18.7 |
| $B_2O_3$ | 16.0 | 17.4 | 17.3 | 17.0 | 15.6 | 15.8 | 15.6 | 15.6 | 15.2 | 16.0 | 15.6 | 15.7 |
| $SiO_2 + B_2O_3$ | 31.0 | 34.8 | 33.6 | 34.0 | 34.2 | 34.6 | 35.0 | 34.2 | 33.2 | 35.7 | 35.1 | 34.4 |
| $P_2O_5$ | — | — | — | 1.0 | — | — | — | — | — | — | — | — |
| $Li_2O$ | — | — | — | — | — | 0.8 | — | — | 2.4 | — | — | — |
| $Na_2O$ | — | — | — | — | — | 0.3 | — | — | 0.9 | 0.1 | — | 2.0 |
| $K_2O$ | — | — | — | — | — | 0.2 | — | — | 0.5 | — | — | — |
| Alkali metal | | | | | | | | | | | | |

TABLE 1-continued

| | Composition in percent by weight | | | | | | | | | | | |
|---|---|---|---|---|---|---|---|---|---|---|---|---|
| Oxide | 1 | 2 | 3 | 4 | 5 | 6 | 7 | 8 | 9 | 10 | 11 | 12 |
| oxides | — | — | — | — | — | 1.3 | — | — | 3.8 | 0.3 | — | 2.0 |
| MgO | — | — | — | — | 1.9 | 1.0 | 1.0 | — | — | — | 1.0 | — |
| CaO | 11.5 | 11.8 | 11.7 | 12.4 | 8.8 | 12.4 | 8.8 | 8.8 | 8.5 | 8.5 | 8.8 | 9.9 |
| MgO + CaO | 11.5 | 11.8 | 11.7 | 12.4 | 10.7 | 13.4 | 9.8 | 8.8 | 8.5 | 8.5 | 9.8 | 9.9 |
| BaO | 8.0 | 3.0 | 3.1 | 1.0 | 2.0 | — | 2.0 | 2.0 | 2.8 | — | 2.0 | 2.0 |
| SrO | 5.0 | 8.2 | 8.1 | 8.0 | 9.8 | 7.9 | 9.8 | 9.8 | 9.5 | 8.0 | 9.8 | 8.0 |
| BaO + SrO | 13.0 | 11.2 | 11.2 | 9.0 | 11.8 | 7.9 | 11.8 | 11.8 | 12.3 | 9.0 | 11.8 | 10.0 |
| ZnO | — | — | — | — | — | — | — | — | — | 4.0 | — | — |
| PbO | — | — | — | — | — | — | 2.0 | — | — | — | — | — |
| Al$_2$O$_3$ | 1.0 | — | — | — | 0.2 | 0.2 | 0.2 | 0.2 | 0.2 | 0.2 | 0.2 | 0.2 |
| La$_2$O$_3$ | 26.3 | 24.6 | 26.0 | 22.4 | 23.4 | 19.1 | 23.4 | 23.4 | 16.1 | 19.5 | 22.8 | 23.2 |
| Y$_2$O$_3$ | — | — | — | 1.0 | — | 1.0 | — | — | — | 1.0 | — | — |
| Bi$_2$O$_3$ | — | — | — | — | — | — | — | — | — | — | — | — |
| ZrO$_2$ | — | — | — | — | — | 2.0 | — | — | — | 2.0 | — | — |
| TiO$_2$ | 17.0 | 17.4 | 17.3 | 17.0 | 16.6 | 16.8 | 16.6 | 16.5 | 22.9 | 17.1 | 16.6 | 17.8 |
| Ta$_2$O$_5$ | — | — | — | — | — | — | — | — | — | — | 0.5 | 1.0 |
| Nb$_2$O$_5$ | — | — | — | 3.0 | 2.9 | 3.0 | 3.0 | 2.9 | 2.8 | 3.0 | 3.0 | 1.5 |
| WO$_3$ | — | — | — | — | — | 0.5 | — | — | — | 0.5 | — | — |
| As$_2$O$_3$ | 0.2 | 0.2 | 0.2 | 0.2 | 0.2 | 0.2 | 0.2 | 0.2 | 0.2 | 0.2 | 0.2 | — |
| NaCl | — | — | — | — | — | — | — | — | — | 0.2 | — | — |
| nd | 1.7992 | 1.7892 | 1.7958 | 1.7928 | 1.7927 | 1.7846 | 1.7893 | 1.7986 | 1.8115 | 1.7737 | 1.7889 | 1.7861 |
| vd | 34.1 | 34.4 | 34.3 | 33.7 | 33.6 | 33.7 | 33.8 | 33.1 | 30.4 | 33.2 | 33.6 | 33.4 |
| s | 3.78 | 3.67 | 3.71 | 3.60 | 3.67 | 3.54 | 3.66 | 3.74 | 3.54 | 3.56 | 3.66 | |

TABLE 2

| | Composition in mol percent | | | | | | | | | | | |
|---|---|---|---|---|---|---|---|---|---|---|---|---|
| Oxide | 1 | 2 | 3 | 4 | 5 | 6 | 7 | 8 | 9 | 10 | 11 | 12 |
| SiO$_2$ | 22.9 | 25.3 | 24.1 | 24.9 | 27.2 | 26.0 | 28.6 | 28.1 | 24.4 | 28.5 | 28.7 | 27.3 |
| B$_2$O$_3$ | 21.2 | 21.9 | 22.1 | 21.5 | 19.7 | 18.9 | 19.8 | 20.4 | 17.8 | 19.9 | 19.8 | 19.8 |
| SiO$_2$ + B$_2$O$_3$ | 44.1 | 47.2 | 46.2 | 46.4 | 46.9 | 44.9 | 48.4 | 48.5 | 42.2 | 48.4 | 48.5 | 47.1 |
| P$_2$O$_5$ | — | — | — | 0.6 | — | — | — | — | — | — | — | — |
| Li$_2$O | — | — | — | — | — | 2.2 | — | — | 6.5 | — | — | — |
| Na$_2$O | — | — | — | — | — | 0.4 | — | — | 1.2 | 0.4 | — | 2.8 |
| K$_2$O | — | — | — | — | — | 0.2 | — | — | 0.4 | — | — | — |
| Alkali metal oxides | — | — | — | — | — | 2.8 | — | — | 8.1 | 0.4 | — | 2.8 |
| MgO | — | — | — | — | 4.1 | 2.1 | 2.2 | — | — | — | 2.2 | — |
| CaO | 18.8 | 18.4 | 18.6 | 19.4 | 13.8 | 18.4 | 13.9 | 14.3 | 12.3 | 13.2 | 13.9 | 15.5 |
| MgO + CaO | 18.8 | 18.4 | 18.6 | 19.4 | 17.9 | 20.5 | 16.1 | 14.3 | 12.3 | 13.2 | 16.1 | 15.5 |
| BaO | 4.8 | 1.7 | 1.8 | 0.6 | 1.1 | — | 1.2 | 1.2 | 1.5 | — | 1.1 | 1.1 |
| SrO | 4.4 | 6.9 | 6.9 | 6.8 | 8.3 | 6.3 | 8.4 | 8.6 | 7.4 | 6.7 | 8.4 | 6.8 |
| BaO + SrO | 9.2 | 8.6 | 8.7 | 7.4 | 9.4 | 6.3 | 9.6 | 9.8 | 8.9 | 6.7 | 9.5 | 7.9 |
| ZnO | — | — | — | — | — | — | — | — | — | 4.3 | — | — |
| PbO | — | — | — | — | — | — | 0.8 | — | — | — | — | — |
| Al$_2$O$_3$ | 0.9 | — | — | — | 0.2 | 0.2 | 0.2 | 0.2 | 0.2 | 0.2 | 0.2 | 0.2 |
| La$_2$O$_3$ | 7.4 | 6.6 | 7.1 | 6.0 | 6.3 | 4.9 | 6.3 | 6.5 | 4.0 | 5.2 | 6.7 | 6.2 |
| Y$_2$O$_3$ | — | — | — | 0.4 | — | 0.4 | — | — | — | 0.4 | — | — |
| Bi$_2$O$_3$ | — | — | — | — | — | — | — | — | — | — | — | — |
| ZrO$_2$ | — | — | — | — | — | 1.3 | — | — | — | 1.4 | — | — |
| TiO$_2$ | 19.5 | 19.1 | 19.3 | 18.7 | 18.2 | 17.5 | 18.4 | 18.8 | 23.3 | 18.6 | 18.4 | 19.6 |
| Ta$_2$O$_5$ | — | — | — | — | — | — | — | — | — | — | 0.1 | 0.2 |
| Nb$_2$O$_5$ | — | — | — | 1.0 | 1.0 | 0.9 | 0.9 | 1.0 | 0.9 | 0.9 | 0.9 | 0.5 |
| WO$_3$ | — | — | — | — | — | 0.2 | — | — | — | 0.2 | — | — |
| As$_2$O$_3$ | 0.1 | 0.1 | 0.1 | 0.1 | 0.1 | 0.1 | 0.1 | 0.1 | 0.1 | 0.1 | — | — |
| NaCl | — | — | — | — | — | — | — | — | — | — | — | — |

Melting Example

Composition:

| Oxides | Percent by Weight | Starting Materials | Kg amounts weighed in for a 90 kg computed quantity of glass |
|---|---|---|---|
| SiO$_2$ | 18.7 | SiO$_2$ | 16.926 |
| B$_2$O$_3$ | 15.7 | H$_3$BO$_3$ | 25.296 |
| Li$_2$O | 0.8 | Li$_2$CO$_3$ | 1.769 |
| Na$_2$O | 0.3 | Na$_2$CO$_3$ | 0.455 |
| K$_2$O | 0.2 | K$_2$CO$_3$ | 0.267 |
| MgO | 1.0 | MgCO$_3$ | 2.292 |
| CaO | 12.4 | CaCO$_3$ | 20.059 |
| SrO | 7.9 | Sr(NO$_3$)$_2$ | 14.457 |
| Al$_2$O$_3$ | 0.2 | AlO(OH) | 0.237 |
| La$_2$O$_3$ | 19.1 | La$_2$O$_3$ | 17.184 |
| Y$_2$O$_3$ | 1.0 | Y$_2$O$_3$ | 0.889 |
| TiO$_2$ | 16.8 | TiO$_2$ | 15.168 |
| ZrO$_2$ | 2.0 | ZrO$_2$ | 1.798 |
| Nb$_2$O$_5$ | 3.0 | Nb$_2$O$_5$ | 2.668 |
| NaCl | 0.2 | NaCl | 0.178 |
| WO$_3$ | 0.5 | WO$_3$ | 0.445 |
| As$_2$O$_3$ | 0.2 | As$_2$O$_3$ | 0.178 |

After weighing in, the starting materials are mixed in a commercial mechanical mixer. The mixture is melted down, for example, in a Pt-crucible at 1200°–1220° C., refined at 1280° C. for 4 hours and then stirred until the temperature drops to about 1060° C. The resultant melt is drained through a Pt-pipe and is processed into a bar or a blob.

The preceding examples can be repeated with similar success by substituting the generically or specifically described reactants or operating conditions of this invention for those used in the preceding examples.

From the foregoing description, one skilled in the art to which this invention pertains can easily ascertain the essential characteristics thereof and, without departing from the spirit and scope of the present invention, can make various changes and modifications to adapt it to various usages and conditions.

What is claimed is:

1. A glass for spectacle lenses having a refractive index nd of 1.77–1.81, a dispersion nd of 30.4–34.4 a specific gravity s of 3.4–3.8 and a thermal expansion coefficient $\alpha \times 10^7$ at 20°–200° C. of $\leq 100$, said glass consisting essentially of:

(a) more than 80 mol percent of mono and polyvalent cationic oxides having a molecular weight $\leq 100$, namely

| | |
|---|---|
| $SiO_2$ | 22–30 mol percent |
| $B_2O_3$ | 17–23 mol percent |
| $SiO_2 + B_2O_3$ | 40–49 mol percent |
| Alkali metal oxides | 0–8 mol percent |
| CaO | 12–20 mol percent |
| MgO + CaO | 12–22 mol percent |
| $TiO_2$ | 17–24 mol percent; and correspondingly |

(b) less than 20 mol percent of cationic oxides having a molecular weight of >100, namely

| | |
|---|---|
| $La_2O_3$ | 4–8 mol percent |
| $P_2O_5$ | 0–1 mol percent |
| BaO | 0–5 mol percent |
| SrO | 3–10 mol percent |
| BaO + SrO | 5–10 mol percent |
| PbO | 0–2 mol percent |
| $Al_2O_3$ | 0–1 mol percent |
| $ZrO_2$ | 0–2 mol percent |
| $Nb_2O_5$ | 0–1.5 mol percent |
| $Ta_2O_5$ | 0–1.5 mol percent } 0–2 |
| $WO_3$ | 0–0.5 mol percent | said glass further having no pronounced tendency toward crystallization in a viscosity range of >200 poises as determined by the magnitude of the crystal growth speed and the crystallization temperature range in relation to the viscosity.

2. A glass composition according to claim 1, having a refractive index nd of 1.7739–1.7992 and a specific gravity s of 3.54–3.78, comprising:

| | |
|---|---|
| $SiO_2$ | 22.9–28.7 mol percent |
| $B_2O_3$ | 17.8–22.1 mol percent |
| $SiO_2 + B_2O_3$ | 42.2–48.5 mol percent |
| MgO + CaO | 12.3–21.5 mol percent |
| $TiO_2$ | 17.5–23.3 mol percent; and correspondingly |

(b) less than 20 mol percent of cationic oxides having a molecular weight of >100, namely

| | |
|---|---|
| $La_2O_3$ | 4.0–7.4 mol percent |
| $P_2O_5$ | 0–1 mol percent; and |
| BaO + SrO | 6.3–9.8 mol percent. |

3. A glass composition according to claim 2, containing 12.3–19.4 mol percent CaO.

4. A glass composition according to claim 3, containing 4.4–8.6 mol percent SrO.

* * * * *